June 23, 1936.　　　　R. ERLING　　　　2,044,777
PRESSURE CONTROL VALVE FOR FLUID OPERATED MECHANISM
Filed March 17, 1934　　　3 Sheets-Sheet 1
Fig. 3
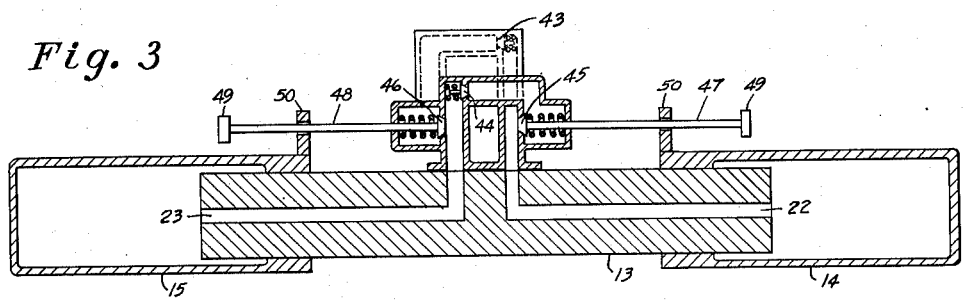
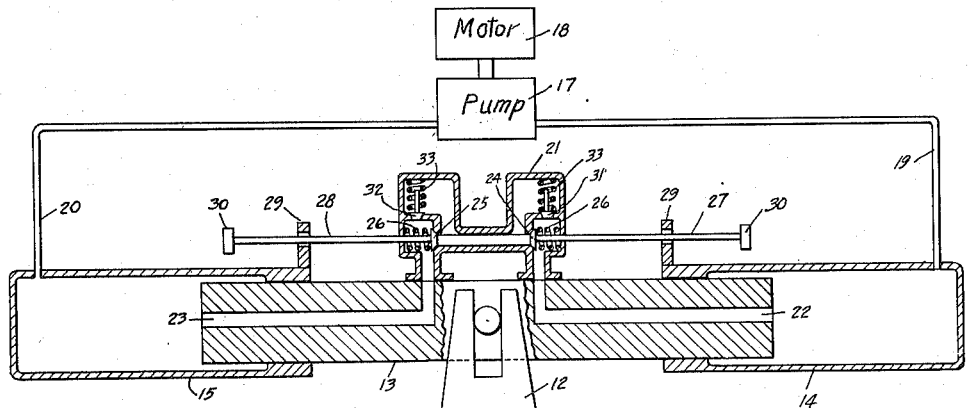
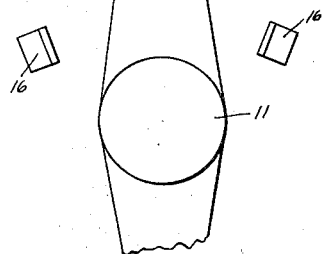
Fig. 1
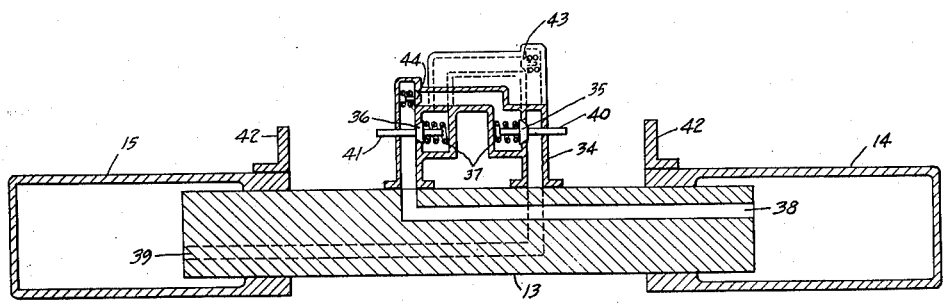
Fig. 2
Ralph Erling
INVENTOR
BY Harold Dodd
ATTORNEY June 23, 1936. R. ERLING 2,044,777
PRESSURE CONTROL VALVE FOR FLUID OPERATED MECHANISM
Filed March 17, 1934 3 Sheets-Sheet 2

Ralph Erling
INVENTOR

BY *Harold Todd*
ATTORNEY

June 23, 1936.  R. ERLING  2,044,777
PRESSURE CONTROL VALVE FOR FLUID OPERATED MECHANISM
Filed March 17, 1934  3 Sheets-Sheet 3
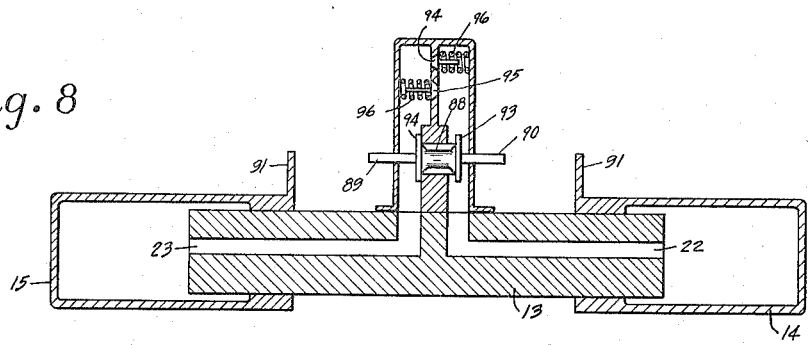
Fig. 8
Fig. 7
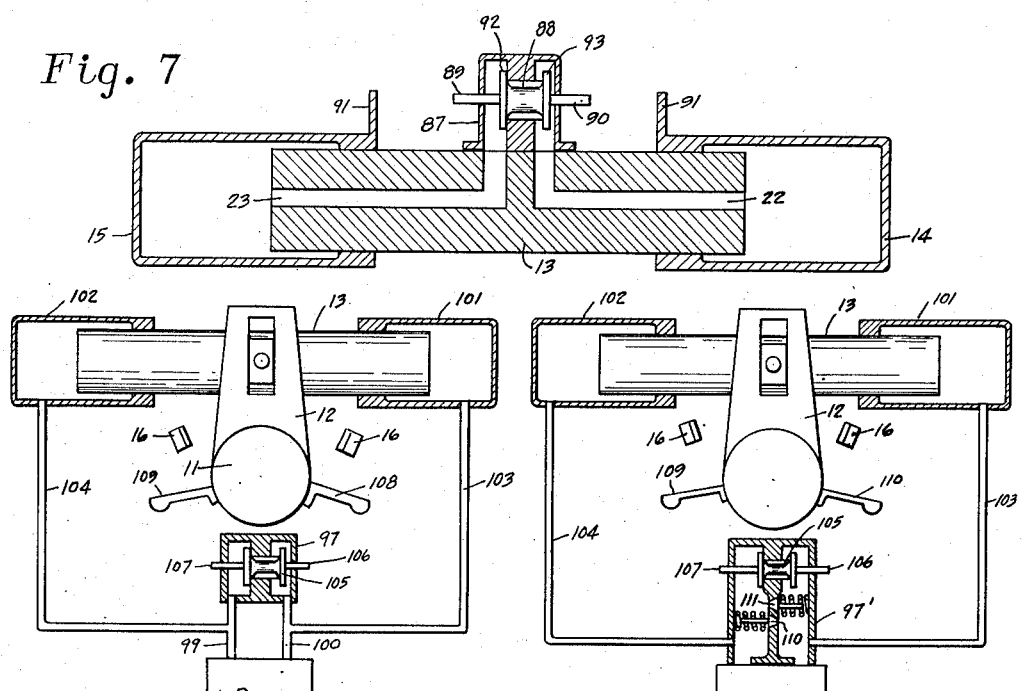
Fig. 9  Fig. 10
Ralph Erling
INVENTOR
BY Harold Dodd
ATTORNEY Patented June 23, 1936

2,044,777

UNITED STATES PATENT OFFICE 2,044,777

PRESSURE CONTROL VALVE FOR FLUID OPERATED MECHANISM

Ralph Erling, Alexandria, Va.

Application March 17, 1934, Serial No. 716,145

15 Claims. (Cl. 60—52)

(Granted under the act of March 3, 1883, as amended April 30, 1928; 370 O. G. 757)

This invention relates to mechanism operated by fluid pressure and more particularly to by-pass and relief valves for automatically controlling the pressure therein.

Among the objects of this invention are:

To simplify the construction of such devices;

To eliminate the greater part of the piping heretofore necessary with installations of this nature;

To provide a mechanical assembly adapted for use with a combined by-pass and relief valve.

In the drawings:

Figs. 1 and 4 are sectional views of an embodiment of my invention wherein the housing for the by-pass and relief valves is mounted on the ram of the hydraulic mechanism;

Figs. 2 and 3 are in general similar to Fig. 1 but disclose the use of the same valves for both by-pass and relief purposes;

Figs. 7 and 8 show a by-pass shuttle valve mounted on the ram, the latter having in addition spring loaded relief valves;

Figs. 9 and 10 show valve constructions similar to those of Figs. 7 and 8, respectively, but with the valve housing separate from the ram and with arms carried by a rudder post to unseat the by-pass valve.

Figure 5:
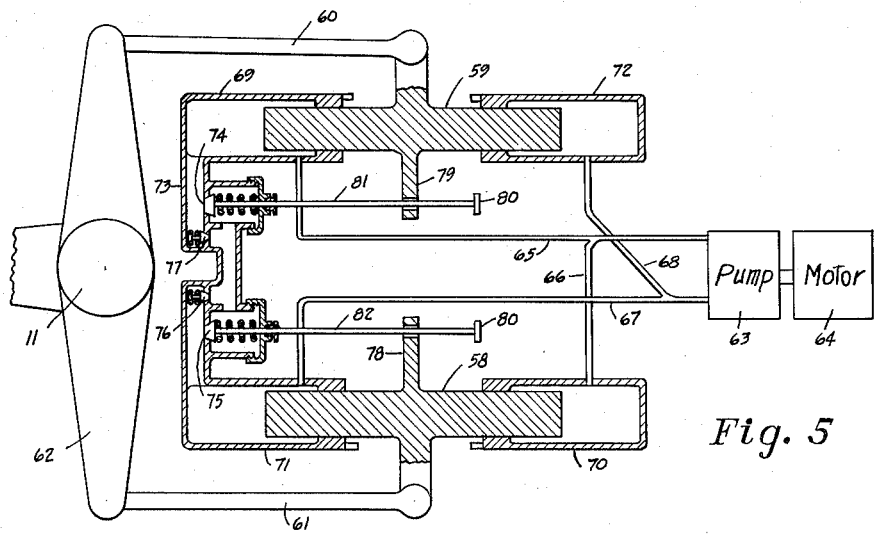
Figs. 5 and 6 illustrate applications of my inventions to two rams.

While the present invention will be described in connection with hydraulic steering gear, it is to be understood that its usefulness is not limited thereto but extends to any and all kinds of hydraulic apparatus wherein pressure control of the nature herein described is necessary.

In hydraulic steering gears it is necessary to have two types of valves, one to relieve the oil pressure at any rudder angle if the pressure exceeds a predetermined magnitude, and the other to prevent the rudder being forced into the hard-over stops under power at any pressure up to the aforesaid predetermined magnitude. The present disclosure sets forth the combination of these two functions in one valve, thus simplifying the steering gear or other hydraulic mechanism by eliminating one complete set of valves and its piping.

In Fig. 1 the rudder post 11 is connected by a rudder crosshead 12 to a ram 13 having its ends disposed in cylinders 14 and 15 to operate as pistons therein, the hard-over stops to limit the movement of the rudder being indicated by numeral 16. Variable delivery pump 17, driven by motor 18, both of well known construction, is connected to cylinders 14 and 15 by pipes 19 and 20, respectively, to supply fluid to and withdraw fluid from the cylinders.

Mounted upon the ram 13 between cylinders 14 and 15 is a valve housing 21 having in it a plurality of interconnectible chambers whereof one is directly connected to cylinder 14 by a duct 22 in the ram and another is likewise connected to cylinder 15 by duct 23. Disposed in positions to be forced against their seats by pressure in the cylinders as transmitted through ducts 22 and 23 are by-pass valves 24 and 25, preferably loaded by light springs 26, and having stems 27 and 28, respectively, extending outwardly through the valve housing, each of which stems passes through an aperture in a fixed member 29 and has at its outer end a head 30 of greater area than the aperture in the fixed member. In housing 21, positioned to be subjected to pressure from the ducts 22 and 23, respectively, are relief valves 31 and 32, loaded by springs 33.

It is apparent that when pump 17 is supplying fluid under pressure to cylinder 14 if at any time the pressure rises above the predetermined maximum fixed by loading spring 33 valve 31 will be unseated and fluid will pass through the opening controlled thereby and traverse the housing to valve 25, which will be unseated by the fluid thus transmitted and such fluid will pass into duct 23 and thence into cylinder 15 due to the fact that the pump is withdrawing fluid from the last named cylinder. However, if the pressure at no time rises sufficiently to unseat the relief valve 31, as the crosshead 12 approaches the hard-over stop 16 head 31 on stem 27 will contact the adjacent fixed member 29 and unseat by-pass valve 24, thereby relieving the pressure in cylinder 14 to cylinder 15 and checking further movement of the crosshead toward the stop 16. The valves 25 and 32 will operate in the manner above described for valves 24 and 31 when 15 is the pressure cylinder.

Fig. 2 discloses a valve housing 34 mounted upon the ram 13 having in it valves 35 and 36 loaded by springs 37 disposed to be unseated by pressure through the ducts 38 and 39, respectively, in excess of the maximum set by the loading springs. In addition, these valves have stems 40 and 41, respectively, extending through the housing 34 to contact fixed members 42 near the end of movement of the ram in one direction or the other. Therefore, if the valves 35 and 36 do not function as relief valves during the course of any stroke, that one which is approaching a fixed member 42 is opened by contact of its stem 40 or 41, as the case may be, with the adjacent fixed member 42 and the fluid is by-passed from one cylinder to the other and movement of the ram is stopped. Check valves 43 and 44 are provided to permit escape of fluid that passes valves 36 or 35, respectively, but to otherwise prevent transfer of fluid from one cylinder to the other.

The form of my invention shown in Fig. 3 is a combination of the mechanisms of Figs. 1 and 2. In Fig. 3 the by-pass and relief valves 45 and 46 are operated as by-pass valves by pull on the stems 47 and 48, respectively, due to contact of the heads 49 with the fixed members 50 instead of being pushed open as in Fig. 2. The check valves 43 and 44 function in the same manner as in Fig. 2. In Figs. 2 and 3 the portions of the valve housings not normally visible in the plane of the figures have been indicated in dotted lines to make clear the construction of these housings.

Figure 4:
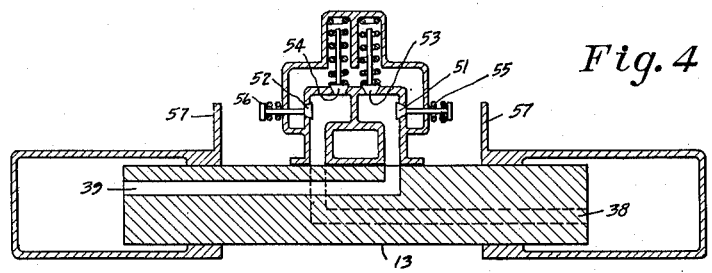

Fig. 4 is very similar to Fig. 2 except that the valves 51 and 52 are by-pass valves only, the relief valves subjected to pressure simultaneously with the by-pass valves being designated 53 and 54, respectively. The by-pass valves 51 and 52 are pushed open by contact of the heads on stems 55 and 56 with the fixed members 57.

Figure 6:
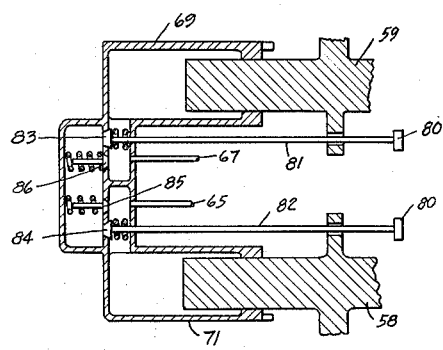

Figs. 5 and 6 illustrate the application of my invention to an installation having two rams 58 and 59 connected to rudder post 11 by links 60 and 61 and yoke 62. As is common in this art, the pump 63 driven by motor 64 is connected through pipes 65, 66 and 67, 68 to diagonally opposite cylinders, 69, 70 and 71, 72 to cause the torques exerted by the rams 58 and 59 upon rudder post 11 to be additive. The adjacent cylinders 69 and 71 are connected together by a valve housing 73 wherein are disposed by-pass and relief valves 74 and 75 to control the fluid pressure in the respective diagonally opposite pairs of cylinders. If the pressure in cylinders 69 and 70 becomes unduly high, the valve 74 is unseated thereby and the fluid is transferred through check valve 76 into cylinder 71. Likewise, excessive pressures in cylinders 71 and 72 are relieved through the valves 75 and 77. The valves 74 and 75 are caused to function as by-pass valves by contact of the members 78 and 79 carried by rams 58 and 59, respectively, with the heads 80 on valve stems 81 and 82. The mechanism of Fig. 6 is in general similar to that of Fig. 5 except that the valves 83 and 84 are by-pass valves only, the cooperating relief valves being respectively 85 and 86.

In Fig. 7 the housing 87 is mounted on ram 13 and the two chambers therein are in communication with cylinders 14 and 15 through ducts 22 and 23. The two chambers in the housing 87 may be placed in communication through an opening in which is seated a shuttle valve 88 having stems 89 and 90 extending from the ends thereof to unseat the valve when brought into contact with fixed members 91 carried by the cylinders. It is apparent that, owing to the great difference between the cross sectional area of a stem 89 or 90 and that of the median portion of valve 88 between the heads 92 and 93 thereof, fluid under pressure in one of the cylinders will exert a differential pressure on the outer face of the head 92 or 93, as the case may be, and so seat shuttle valve 88 as to prevent transfer of fluid from one cylinder to the other through the opening between the chambers and housing 87. However, as the stroke of the ram nears completion the stem 90, as shown for purpose of illustration in Fig. 7, will contact the member 91 and unseat valve 88, thus by-passing fluid from one cylinder to the other and arresting the motion of the ram.

The mechanism in Fig. 8 is in all respects similar to that in Fig. 7 except that relief valves 94 and 95 have been provided to prevent the increase of pressure beyond the magnitude determined by loading springs 96.

In Fig. 9 the valve housing 97 is shown connected to the pump 98 by pipes 99 and 100 which are also connected to cylinders 101 and 102 by pipes 103 and 104. Shuttle valve 105 is mounted in a passage between the chambers of housing 97 and has stems 106 and 107 extending outwardly to be contacted by arms 108 and 109 mounted upon or actuated by the rudder post 11 or rudder crosshead 12 to unseat the valve substantially at the end of movement of the rudder crosshead toward the stops 16 and so by-pass the fluid and check the movement of the ram 13.

The device shown in Fig. 10 is in general similar to that disclosed in Fig. 9 but relief valves 110 and 111 are provided to prevent excessive pressures being applied in the system, and the chambers of the valve housing 97' communicate directly with the outlets of the pump, upon which the housing is mounted. It is believed that the operation of the several modifications of my invention will be clearly apparent from the foregoing.

The invention described herein may be manufactured and used by or for the Government of the United States of America for governmental purposes without the payment of any royalties thereon or therefor.

I claim:

1. Fluid pressure mechanism, comprising a pair of cylinders, a piston in each cylinder actuatable by fluid pressure therein, a valve housing having a chamber in communication with each cylinder to receive fluid from the cylinder, there being a passage between said chambers, a valve to close said passage, loading means to hold said valve seated until the pressure in the chamber exceeds a predetermined magnitude and then permit unseating of the valve by such pressure, a second valve disposed to close a second passage between said chambers and to be held seated by the fluid pressure, a stem connected to said second valve and extending through the wall of the chamber and an element disposed to contact said stem and unseat the second valve substantially at the end of travel of the piston in one direction by relative movement of the valve and the element due to operation of the piston.

2. Fluid pressure mechanism, comprising a pair of cylinders, a ram having an end disposed in each of said cylinders to act as a piston therein, a valve housing having two chambers, each of which is in communication with one of said cylinders, and a passage between said chambers, a shuttle valve disposed to control transfer of fluid through said passage, a stem extending from each end of said valve, and means relatively movable with respect to said valve by motion of said ram to contact said stems and unseat said valve.

3. Fluid pressure mechanism, comprising a pair of axially aligned cylinders, a piston in each, a valve housing operatively connected to both of said pistons to move as a unit therewith, said housing having in it two chambers with a passage between, there being in said pistons ducts communicating with said chambers and said cylinders, a shuttle valve disposed in said passage, a stem extending from each end of said valve, and means relatively movable with respect to said valve by motion of said pistons to contact said stems and unseat said valve.

4. Fluid pressure mechanism, comprising an actuatable member, fluid pressure operated means to actuate said member in opposite directions; and means to control the flow of fluid in said means including a housing having two chambers with a passage between them, a shuttle valve operatively disposed in said passage, a stem extending from each end of said valve, and means connected to said member to be moved thereby to contact said stems and unseat said valve substantially at the end of movement of said member in each direction.

5. Fluid pressure mechanism, comprising a pair of cylinders, a piston in each cylinder, said pistons being connected to move as a unit, a valve housing mounted between said pistons to move therewith, said housing having two chambers respectively communicating with said cylinders and a passage between said chambers, a shuttle valve mounted in said passage, a stem extending from each end of said valve, and means associated with each of said cylinders to contact the stem adjacent thereto and unseat said valve substantially at the end of movement of a piston into its cylinder.

6. Fluid pressure mechanism, comprising an actuatable member, fluid pressure operated means to actuate said member in opposite directions; and means to control the flow of fluid in said means including a housing having two chambers and a passage between said chambers, a shuttle valve in said passage, a stem extending from each end of said valve, means operatively associated with said member to contact said stems and unseat said valve substantially at the end of movement of said member in each direction, and oppositely disposed relief valves unseatable by pressure in excess of a predetermined magnitude to permit transfer of fluid from one of said chambers to the other.

7. Fluid pressure mechanism, comprising an actuatable member, fluid pressure operated means to actuate said member in opposite directions; and means to control the flow of fluid in said means including a housing having two chambers and a passage between said chambers, a shuttle valve in said passage, a stem extending from each end of said valve, and means operatively associated with said member to contact said stems and unseat said valve substantially at the end of movement of said member in each direction.

8. The combination with a rudder crosshead, of a ram connected thereto, cylinders in which the ends of said ram are operable as pistons; and a fluid transfer system connected to both said cylinders including a valve housing having two chambers and a passage between said chambers, a shuttle valve in said passage, a stem extending from each end of said valve, and means operable by said crosshead to contact said stems and unseat said valve substantially at the end of movement of said crosshead in each direction.

9. The combination with an oscillatable member, of two pistons connected to move as a unit and operatively connected to said member, cylinders in which said pistons are respectively operable; and fluid transfer means connected to both said cylinders including a valve housing having two chambers and a passage between said chambers, a shuttle valve in said passage, a stem extending from each end of said valve, and means operable by said member to contact said stems and unseat said valve substantially at the end of movement of said member in each direction.

10. The combination with an oscillatable member, of two pistons connected to move as a unit and operatively connected to said member, cylinders in which said pistons are respectively operable; and fluid transfer means connected to both said cylinders including a valve housing having two chambers and a passage between said chambers, a shuttle valve in said passage, a stem extending from each end of said valve, means operable by said member to contact said stems and unseat said valve substantially at the end of movement of said member in each direction, and a relief valve operatively disposed to control the maximum pressure in each of said chambers, each of said relief valves being unseatable by pressure in its respective chamber in excess of a predetermined magnitude.

11. The combination with an oscillatable member, of two pistons connected to move as a unit and operatively connected to said member, cylinders in which said pistons are respectively operable, means to supply fluid under pressure to one of said cylinders while simultaneously withdrawing fluid from the other, alternately, a housing having in it two chambers with a passage between them, said chambers being respectively in communication with said cylinders, a shuttle valve to control transfer of fluid through said opening, and means to unseat said valve substantially at the end of movement of said member in each direction.

12. In combination, two cylinders, a piston operable in each, said pistons being connected together to move as a unit; and a fluid transfer system interconnecting said cylinders including a single valve housing, a relief valve in said housing to relieve pressures in each of said cylinders in excess of a predetermined maximum, a by-pass valve in said housing to permit flow of fluid from each of said cylinders to the other, and means functioning substantially at the end of outward movement of each piston in its cylinder to open the by-pass valve controlling the flow of fluid from the cylinder in which the piston is moving.

13. In combination, two cylinders, a piston operable in each, said pistons being connected together to move as a unit; and a fluid transfer system interconnecting said cylinders including a single valve housing, a relief valve in said housing to relieve pressures in each of said cylinders in excess of a predetermined maximum, a shuttle valve in said housing unseatable to permit flow of fluid from one of said cylinders to the other adapted to be held seated by pressure in either of said cylinders, and means functioning substantially at the end of outward movement of each of said pistons in its cylinder to unseat said by-pass valve and permit flow of fluid from the cylinder in which the piston is moving outwardly.

14. In combination, two pistons connected together to move as a unit, cylinders in which said pistons are respectively operable; and fluid transfer means connected to both said cylinders including a bi-chamber valve housing mounted to move with said pistons, there being a passage between the chambers of said housing, a valve in said passage seatable by pressure in either of said cylinders, and means to unseat said valve substantially at the end of outward movement of each piston.

15. In combination, two pistons connected together to move as a unit, cylinders in which said pistons are respectively operable; and fluid transfer means connected to both said cylinders including a valve housing mounted to move with said pistons, and valve mechanism in said housing operatively associated with said pistons to control transfer of fluid from one of said cylinders to the other through said housing.

RALPH ERLING.